United States Patent Office 3,803,124
Patented Apr. 9, 1974

3,803,124
PROCESS FOR THE PREPARATION OF ADRIAMYCIN AND ADRIAMYCINONE AND ADRIAMYCIN DERIVATIVES
Federico Arcamone, Giovanni Franceschi, and Sergio Penco, Milan, Italy, assignors to Societá Farmaceutici Italia, Milan, Italy
No Drawing. Continuation-in-part of abandoned application Ser. No. 812,402, Apr. 1, 1969. This application Aug. 31, 1971, Ser. No. 176,729
Claims priority, application Italy, Apr. 12, 1968, 15,159/68; May 4, 1971, 24,030/71
Int. Cl. C07c 129/18
U.S. Cl. 260—210 AB          10 Claims

ABSTRACT OF THE DISCLOSURE

Described is a chemical process of preparing adriamycin and its aglycone, adriamycinone. A compound selected from the group consisting of daunomycin, daunomycinone and its derivatives is reacted in an inert organic solvent with a halogen of the group consisting of bromine and iodine. The thus obtained corresponding 14-halo-derivative is reacted with an alkali-metal acetate in the presence of a polar solvent. The corresponding 14-acetoxy-derivative is transformed by alkaline hydrolysis into the 14-hydroxy-derivative which is isolated and purified after eliminating the protecting group of the amino group of the amino sugar. Also described are compounds of the formula:

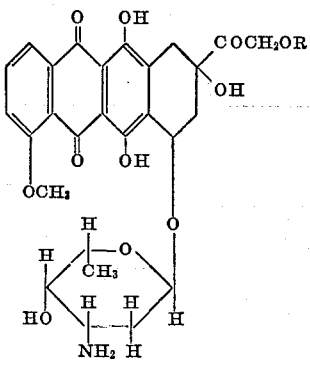

The present application is a continuation-in-part of application Ser. No. 812,402, filed Apr. 1, 1969, now abandoned.

The present invention relates to the preparation of adriamycin, adriamycinone and a new class of therapeutiactive adriamycin derivatives.

More particularly, the present invention has among its objects a chemical synthesis for the preparation of adriamycin and its aglycone, adriamycinone.

"Adriamycin" is a known antibiotic has been described and claimed together with its derivatives in U.S. Pat. No. 3,590,028 to Arcamone et al. Adriamycin and its aglycone have the following structural formula:

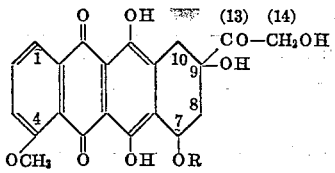

wherein R is either hydrogen (adriamycinone) or

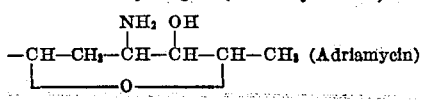 (Adriamycin)

That patent describes and claims a microbiological process using the microorganism Streptomyces peucetius var. caesius for preparing adriamycin.

We have now found a new synthesis for the preparation of adriamycin and its aglycone starting from the antibiotic, daunomycin, or from its aglycone, daunomycinone, respectively, in accordance with the method which will be described hereinbelow.

Daunomycin and its aglycone, daunomycinone, are described and claimed in U.S. application Ser. No. 404,550, filed Oct. 6, 1964, by DiMarco et al.

We react a product of the group consisting of daunomycin, daunomycinone and its derivatives having the structural formula:

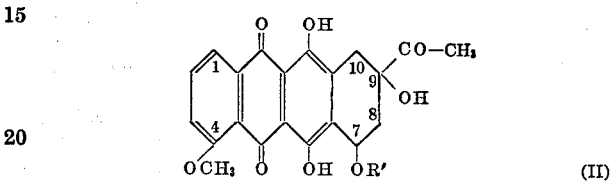   (II)

wherein R' is selected from the group consisting of hydrogen and

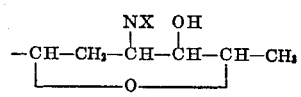

in which X is selected from the group consisting of

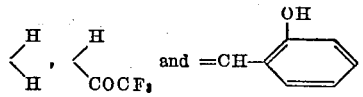

with a halogen selected from the group consisting of bromine and iodine, in a solvent consisting of a mixture of methanol and a cyclic ether in a ratio of 1:1.5 to 1:4.5 by volume. When the term "halogen" is used hereinafter, it is intended to be either bromine or iodine. The 14-halogen-derivative so obtained is reacted with an alkali-metal acetate. The thus obtained 14-acetoxy-derivative yields, by alkaline hydrolysis, the corresponding 14-hydroxy-derivative which is separated and purified after optionally eliminating the protecting group of the amino group of the amino sugar, if present. More particularly, daunomycin or daunomycinone (II) is reacted with bromine or iodine in the presence of an inert organic solvent.

Halogenation with iodine is carried out better in the presence of a base, such as calcium oxide. Other special operating conditions are not required. The reaction is, however, preferably carried out at room temperature and may be optionally carried out in the warm, preferably under an atmosphere of an inert gas.

When the starting product is daunomycin, it is preferred to protect the amino group of the amino sugar with a suitable protecting group, particularly when iodine is used as halogenating agent. One can use for this purpose any of the known protecting groups able to protect the amino group, such as for example an acyl derivative or a Schiff base, for example, the trifluoroacetyl-derivative or the corresponding Schiff base with salicylaldehyde. The trifluoroacetyl derivative of daunomycin has been prepared according to the known techniques by reacting daunomycin, in the form of the free base, with trifluoroacetyl anhydride in the presence of an organic solvent. The Schiff base is obtained by reacting daunomycin hydrochloride with salicylaldehyde.

The halogenation with bromine or iodine yields the corresponding 14-bromo or 14-iodo-derivative, which is reacted with an alkali-metal acetate, such as potassium acetate, in the presence of a polar solvent, such as acetone. The reaction is carried out in the warm for a short time or in the cold over a longer reaction time. The corresponding 14-acetoxy derivative of daunomycin or daunomycinone, which is thus obtained, is transformed into the corresponding 14-hydroxy derivative by alkaline hydrolysis.

Particularly in the case of the 14-bromo derivative, the formation of the corresponding 14-hydroxy derivative may be carried out by treating the 14-bromo derivative directly with alkali.

When daunomycin, having the amino group of the amino sugar protected with a protecting group, is used, the protecting group is eliminated according to the known techniques, before separating the final product. More particularly, the elimination of the salicyliden group may be carried out by acid hydrolysis of N-salicyliden-adriamycin, while the elimination of the trifluoroacetyl group may be carried out after treating N-trifluoroacetyl-adriamycin with ethyl orthoformate and p-toluenesulfonic acid in order to obtain N-trifluoroacetyladriamycin-9,14-ethylorthoformate from which the trifluoroacetyl group is subsequently eliminated by alkaline hydrolysis.

Adriamycin-9,14-ethylorthoformate, so obtained, yields free adriamycin on acid hydrolysis. Adriamycin and adriamycinone, obtained according to the process of the invention, are isolated and purified according to the known techniques of extraction and of purification.

The invention also relates to C-14 adriamycin esters having the following structural formula and their salts with inorganic and organic acids:

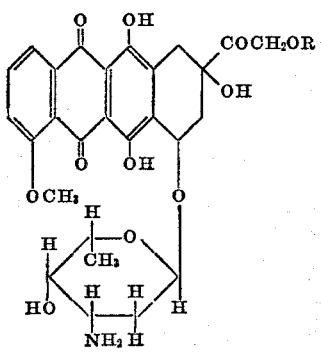

wherein R is an acyl radical of an acid selected from the group consisting of a substituted or unsubstituted, aliphatic mono- or dicarboxylic, aromatic, cycloaliphatic, arylaliphatic, heterocyclic acid having from 1 to 20 carbon atoms, the substituent being selected from the group consisting of halogens, hydroxyl, alkyl, alkoxy groups, free amino groups, mono- or dialkyl-substituted and nitro groups and from an alkyl- or aryl carbonic acid, from carbamic or alkylcarbamic acid and from sulfonic acid.

The esters of adriamycin are prepared by reacting 14-bromo-daunomycin or one of its salts with a salt of the desired acid. More particularly, in accordance with the process of the invention, the 14-bromo-daunomycin or one of its salts such as the hydrochloride, is reacted with a compound of the formula ROM, wherein R is as defined above and M is an alkali or alkali earth metal or a quaternary ammonium radical eventually replaced by alkyl group. The reaction is carried out in the presence of an inert polar solvent, such as acetone, at the boiling temperature for a short time, or in the cold for a protracted reaction time. When the reaction is complete, the obtained product is isolated as such or is transformed into a salt of an inorganic or organic acid and purified by extraction and purification.

PHARMACOLOGY

The compounds of the invention have been tested for antitumoral activity in comparison with adriamycin, an antitumoral compound known in the literature.

(1) Tests "in vitro" on the formation of "foci" by Moloney Sarcoma Virus (MSV)

The compounds have been tested in mouse embryo fibroblast cultures infected or not with MSV.

After a treatment of 6 days, the inhibiting doses 50 ($ID_{50}$) have been evaluated on cell proliferation in uninfected cultures (cytotoxic action) and on MSV foci formation in infected cultures (antiviral action). The ratio between the above two $ID_{50}$ values represents the Therapeutic Index (TI). The results obtained are reported in Table I.

TABLE I

| Compounds | Antiviral action $ID_{50}$, γ/ml. | Cytotoxic action $ID_{50}$ γ/ml. | Therapeutic index, TI |
|---|---|---|---|
| Adriamycin | 0.0078 | 0.010 | 1.3 |
| Adriamycin-14-acetate | 0.0034 | 0.020 | 5.8 |
| Adriamycin-14-octanoate | 0.0250 | 0.100 | 4.0 |
| Adriamycin-14-nicotinate | 0.0380 | 0.086 | 2.3 |
| Adriamycin-14-propionate | 0.0260 | 0.065 | 2.5 |

(2) Toxicity

The toxicity of the compounds has been evaluated on healthy mice treated by endovenous route. In Table II, the acute Lethal Dose 50, subacute Lethal Dose 50 (8 daily administrations) and maximum tolerated dose expressed as Lethal Dose 10 (8 daily administrations) are reported.

TABLE II

| Compounds | Acute $LD_{50}$, mg./kg. | Subacute $LD_{50}$, mg./kg./day | $LD_{10}$ mg./kg. day |
|---|---|---|---|
| Adriamycin | 20.6 | 2.7 | 2.5 |
| Adriamycin-14-acetate | 30.0 | 3.7 | 3.0 |
| Adriamycin-14-octanoate | | 3.8 | 3.1 |
| Adriamycin-14-benzoate | | 4.5 | |
| Adriamycin-14-nicotinate | | 4.0 | |
| Adriamycin-14-propionate | | 3.8 | |
| Adriamycin-14-phenylacetate | | 4.0 | |

(3) Ascites Sarcoma 180

The tests were carried out on groups of 10 mice (Swiss CD-1). The compounds under examination had been administered intraperitoneally to the animals the day after the inoculation by intraperitoneal route of 1×10⁶ tumor cells per animal.

The percentages of the average survival time in comparison with the controls (=100) is reported in Table III.

TABLE III
[Action on ascites sarcoma 180]

| Compounds | Dose, mg./kg. | Average survival time, percentage |
|---|---|---|
| Controls | | 100 |
| Adriamycin | 0.5 | 166 |
| | 1 | 206 |
| | 2 | 233 |
| Adriamycin-14-acetate | 1 | 236 |
| | 2 | 253 |
| Adriamycin-14-octanoate | 1 | 164 |
| | 2 | 205 |
| Adriamycin-14-benzoate | 0.5 | 201 |
| | 1 | 287 |
| | 2 | 266 |

(4) Solid Sarcoma 180

The tests were carried out on mice (Swiss CD-1) subcutaneously grafted with a fragment or neoplastic tissue. The compounds were administered intravenously, starting 24 hours from the tumor inoculation, for 8 consecutive days.

On the eleventh day, the mice were killed and their tumors removed and weighed. The results obtained, expressed as the percent of tumor growth with respect to the controls are reported in Table IV. It can be observed that the compounds of the invention are able to exert the same inhibiting effect on tumor growth as adriamycin and, since the former are less toxic than the latter, their therapeutic index is far better.

TABLE IV
[Action on solid sarcoma 180]

| Compounds | Dose, mg./kg. | Tumor growth, percent |
| --- | --- | --- |
| Controls | | 100.0 |
| Adriamycin | 2.5 | 31.0 |
| Adriamycin-14-acetate | 2.5 | 36.0 |
| Adriamycin-14-octanoate | 2.5 | 32.6 |
| Adriamycin-14-benzoate | 3.25 | 31.6 |
| Adriamycin-14-nicotinate | 2.5 | 37.9 |
| Adriamycin-14-propionate | 2.5 | 35.6 |

(5) Transplanted gross leukemia

Inbred $C_3H/He$ mice were intravenously inoculated with $2.5 \times 10^6$ leukemic cells/mouse and treated, intravenously, from the 1st to the 6th day from the inoculum with the compounds under examination.

The average survival time and the number of long term survivors are reported in Table V.

TABLE V
[Action on transplanted gross leukemia]

| Compounds | Dose, mg./kg. | Average survival time (days) | Number of survivors after 60 days |
| --- | --- | --- | --- |
| Controls | | 10.2 | 0/10 |
| Adriamycin | 1.5 | 15.1 | 0/10 |
| | 2.5 | 16.8 | 0/10 |
| | 4 | Toxic | 0/10 |
| Adriamycin-14-acetate | 1.5 | 17.2 | 0/10 |
| | 2.5 | 18.8 | 0/10 |
| Adriamycin-14-octanoate | 2.5 | 18.7 | 0/10 |
| | 3.25 | 20.6 | 3/10 |
| | 4 | 26.6 | 2/10 |

The following examples illustrate the invention, without limiting it.

EXAMPLE 1

Adriamycin 1.30 g. of daunomycin hydrochloride in 30 ml. of methyl alcohol and 100 ml. of anhydrous dioxane was treated with 3.3 ml. of a bromine solution in chloroform (10 g. of bromine in 100 ml. of chloroform). The reaction mixture was allowed to stand for 4 hours at room temperature, evaporated to dryness under reduced pressure, and the residue was taken up with chloroform (5–10 ml.). 3–5 volumes of ethyl ether were added. Bromodaunomycin hydrochloride precipitates (1.10 g.) which upon recrystallization from chloroform/methanol melts at 177°–178° C.

A solution of 1.0 g. of 14-bromodaunomycin hydrochloride, in 150 ml. of methyl alcohol, was treated with 70 ml. of distilled water. Sufficient 0.1 N sodium hydroxide was added to give a pH of 10.3. It was maintained at this pH for 20 minutes. All the operations are carried out under a nitrogen atmosphere. Then, after diluting with distilled water, the solution was extracted many times with chloroform till all the colored material had passed into the solvent. The combined chloroform extracts were dried over anhydrous sodium sulphate, concentrated under reduced pressure to small volume, mixed with 1.8 ml. of 0.6 N hydrochloric acid in anhydrous methanol and treated with 10 volumes of ethyl ether. An amorphous precipitate (0.72 g.) was obtained, which upon crystallizing from methanol/propanol gave 0.45 g. of adriamycin hydrochloride melting at 205–210° C. (with decomposition).

EXAMPLE 2

Adriamycin

A suspension of 6.60 g. of 14-bromodaunomycin hydrochloride, prepared according to Example 1, in 200 ml. of anhydrous acetone was mixed with 1.8 g. of melted and pulverized potassium acetate. The suspension was filtered after refluxing for 45 minutes. The solution obtained was evaporated to dryness under reduced pressure. The residue, taken up with chloroform, was treated was ethyl ether. The precipitate (0.45 g.) was purified by filtration through a column of silicic acid [solvent system methylene chloride/methanol/water (100:20:2)]; 150 mg. of 14-acetoxydaunomycin melting at 196–198° C. were obtained. A solution of 0.10 g. of 14-acetoxydaunomycin in 30 ml. of acetone/methanol (2:1) was mixed with 10 ml. of a 5% sodium bicarbonate solution. The mixture was allowed to stand for three hours at room temperature and was then extracted repeatedly with chloroform after diluting with water. The chlorofrom extracts were combined and dried over anhydrous sodium sulphate, and then concentrated to small volume under reduced pressure. The concentrated solution was mixed with 0.15 ml. of 0.6 N hydrochloric acid in anhydrous methanol and then with three volumes of ethyl ether. The amorphous precipitate was passed through a column filled with 40 g. of cellulose powder. It was eluted with the solvent system propanol/ethyl acetate/water (7:1:2 in the volume).

The fractions containing adriamycin were combined and evaporated to dryness in order to obtain 43 mg. of adriamycin hydrochloride melting at 204–210° C. (with decomposition).

EXAMPLE 3

Adriamycinone 1 g. of daunomycinone was dissolved in 100 ml. of chloroform and mixed with 6.75 ml. of a bromine solution in chlorofrom (2 ml. of bromine dissolved in 100 ml. of chloroform). After one night at room temperature, the crystalline product formed was filtered off and recrystallized from ethyl acetate to give 1 g. of 14-bromo-daunomycinone melting at 220–225° C. (with decomposition); $[\alpha]_D^{20°} = +165°$ (c.=0.1 in dioxane).

0.6 g. of 14-bromo-daunomycinone was suspended in 300 ml. of anhydrous acetone and mixed with 1.3 g. of melted potassium acetate. The mixture was refluxed for 30 minutes, filtered and evaporated to dryness under reduced pressure. The residue was recrystallized from ethyl acetate to give 0.5 g. of 14-acetoxydaunomycinone which melts at 242°–245° C.; $[\alpha]_D^{20°} = +192°$ (c.=0.1 in dioxane). 0.1 g. of 14-acetoxy-daunomycinone was dissolved in acetone and mixed with 10 ml. of a 10% solution of sodium bicarbonate. After 3 hours at room temperature, the reaction mixture was extracted with chloroform. The chloroform extract was dried and concentrated to small volume under reduced pressure. It was then chromatographed through a column of silica gel and eluted with chloroform which contains 2% of ethanol to remove the starting material still present. The adriamycinone was eluted with chloroform which contains 5% of ethanol. 50 mg. of product which by crystallization from ethyl acetate melts at 228°–230° C., were obtained;

$$[\alpha]_D^{20°} = +156°$$

(c.=0.1 in dioxane).

EXAMPLE 4

Adriamycinone 0.1 g. of 14-bromodaunomycinone obtained according to Example 3 by treatment with 10 ml. of 0.1 N soda at 0° C. for 15 minutes, was converted into adriamycinone which was isolated by chromatography through a silica gel column.

EXAMPLE 5

Adriamycin 4.6 g. of daunomycin free base in 390 ml. of chloroform and 155 ml. of anhydrous ether were treated with 9.3 ml. of trifluooracetic anhydride. The reaction mixture was allowed to stand at room temperature for 30 minutes, extracted with water, and the organic phase was evaporated to dryness under vacuum. The residue was taken up with 100 ml. of anhydrous methanol and was refluxed for 10 minutes. The methanol solution was distilled to dryness and the residue crystallized from tetrahydrofuran/petroleum ether to give 4.5 g. of N-trifluoroacetyldaunomycin melting at 169–171° C. Thereafter 0.6 g. of N-trifluoroacetyldaunomycin in 30 ml. of tetrahydrofuran and 20 ml. of anhydrous methanol were mixed with 0.50 g. of iodine and with 0.50 g. of pulverized calcium oxide. The mixture was shaken in a nitrogen atmosphere for five hours. It was then filtered. The solution, diluted with chloroform, was shaken with water and made acid to litmus by hydrochloric acid. The organic phase was evaporated to dryness under vacuum, the residue was taken up with a little chlorofrom and chromatographed through a column by elution with chloroform containing increasing quantities of ethyl acetate. The desired product was eluted, when the concentration of the ethyl acetate was about 10%. Thus, 0.25 g. of 14-iodo-N-trifluoroacetyldaunomycin, melting at 172–175° C. was obtained.

0.8 g. of the above compound was refluxed for 15 minutes with 60 ml. of anhydrous acetone in the presence of 1.50 g. of melted and pulverized potassium acetate. After filtration, the solution with chlorofrom was shaken with water made slightly acid to litmus with dilute hydrochloric acid. The organic phase was evaporated almost to dryness under vacuum and petroleum ether was added to the residue. 0.62 g. of 14-acetoxy-N-trifluoro-acetyldaunomycin, melting at 150°–153° C., was obtained by precipitation. 1.4 g. of this product, dissolved in a mixture of methanol (50 ml.) and acetone (100 ml.), were mixed with 100 ml. of a 5% sodium bicarbonate aqueous solution. The mixture was maintained at room temperature and under a nitrogen atmosphere for 3 hours. The reaction mixture was then poured into water, acidified with aqueous tartaric acid to a pH of from 5 to 6 and was extracted many times with chloroform, with a total of 350 ml. of the solvent. The organic phases were combined and evaporated under reduced pressure to give a solid residue (0.95 g.) which was taken up with chloroform and chromatographed. N-trifluoroacetyladriamycin, thus obtained, was eluted with chloroform which contains 15% of ethyl acetate. The combined and evaporated eluates gave 0.56 g. of the desired product which melts at 174°–176° C.

0.45 g. of N-trifluoroacetyladriamycin in 80 ml. of dioxane was mixed with 10 ml. of ethyl orthoformate and 3 mg. of p-toluenesulphonic acid. After 48 hours at room temperature, the reaction mixture was diluted with chloroform and washed with water by strongly shaking in a separating funnel. The organic phase, evaporated to small volume, gave a precipitate (35 g.) by addition of petroleum ether. This product was chromatographed through a column of silicic acid (7 g.) by elution with chloroform containing 10% of ethyl acetate. The evaporated eluate gave 80 mg. of 9,14-N-trifluoroacetyladriamycin-ethylchloroformate which melts at 162–164° C.

0.20 g. of this product was dissolved in a mixture of acetone (10 ml.) and 0.1 N sodium hydroxide (30 ml.) in pure nitrogen atmosphere. After 20 minutes at room temperature, the pH was adjusted to 8.6 with 1 N hydrochloric acid and the solution was extracted many times with 50 ml. portions of chloroform until the extracts became colored. The combined chloroform extracts were evaporated to small volume and the residue was dissolved in 9 ml. of acetone mixed with 1 ml. 1 N hydrochloric acid. The mixture was allowed to stand at room temperature for 20 hours. The formed precipitated upon being crystallized from methanol/propanol, gave 40 mg. of adriamycin hydrochloride melting at 204–210° C. (with decomposition).

EXAMPLE 6

Adriamycin 1.00 g. of daunomycin hydrochloride in 30 ml. of distilled water was mixed with 0.1 N sodium hydroxide to a pH of 8.6 and was then treated with 10 ml. of a 10% salicylic aldehyde solution in methanol. The precipitate was taken up and washed with water. It was then crystallized from ethanol to give 0.97 g. of salicylidendaunomycin, melting at 168–170° C.

0.50 g. of salicylidendaunomycin in 20 ml. of tetrahydrofuran was mixed with 10 ml. of anhydrous methanol, 1.0 g. of iodine and 1.0 g. of calcium oxide. The mixture was refluxed slowly for 40 minutes, filtered and evaporated to dryness under reduced pressure. The residue was taken up with chloroform (22 ml.). The chloroform solution was washed with water under shaking and dried, concentrated to small volume and mixed with petroleum ether to obtain complete precipitation. 0.41 g. of crude 14-iodo-salicylidendaunomycin was obtained. The product was taken up with 20 ml. of anhydrous acetone, treated with 0.80 g. of melted and pulverized potassium acetate and refluxed for 20 minutes. The suspension was cooled, filtered and the filtrate was evaporated to dryness under vacuum. The residue consisting of 14-acetoxy-salicylidendaunomycin was dissolved in a mixture of equal parts of methanol and acetone and mixed with 18 ml. of a 5% aqueous sodium bicarbonate solution.

The reaction mixture was extracted with chloroform after 3 hours at room temperature. The chloroform extract was concentrated to about 10 ml. and chromatographed through a column of 3 g. of silicic acid. It was eluted with a solvent mixture of methylene chloride/petroleum ether/methanol (100:50:5). The fractions containing the starting product and other impurities were discarded. The later ones were collected and by evaporation gave 65 mg. of salicylidenadriamycin, melting at 194° C. (with decomposition).

0.20 g. of salicylidenadriamycin in 20 ml. of chloroform was extracted three times with 10 ml. of 0.1 N of hydrochloric acid each time. The colored product was all transferred into the aqueous phase which, in a nitrogen atmosphere, was made alkaline to pH 8.6 with 0.1 N sodium hydroxide and extracted with chloroform up to colorless extracts. The extracts were combined and dried over anhydrous sodium sulphate, concentrated under reduced pressure to about 5 ml. and mixed with 0.5 ml. of 0.6 N hydrochloric acid and 10 volumes of anhydrous ethyl ether. 0.12 g. of adriamycin hydrochloride melting at 205–210° C. (with decomposition) was obtained.

EXAMPLE 7

Adriamycin-14-acetate 1.0 g. of bromodaunomycin hydrochloride was suspended in 600 ml. of anhydrous acetone and treated with 2.5 g. of potassium acetate previously dissolved and finely subdivided. After refluxing for 40 minutes, the suspension was filtered and evaporated to dryness under vacuum. The residue was taken up with a 0.1 N solution of hydrochloric acid and the resultant solution was extracted four times with 30 ml. of chloroform each time (until the extracts were colorless), then with n-butyl alcohol. Several extractions were carried out until all colored products had passed into the organic layer. After concentration of n-butanol under vacuum, 0.6 g. of orange-red, crystalline adriamycin-14-acetate hydrochloride melting at 188–190° C. was obtained; $[\alpha]_D^{20°}=+255°$ (c.=0.1 methanol).

EXAMPLE 8
Adriamycin-2-octanoate 3.0 g. of bromodaunomycin hydrochloride were suspended in 400 ml. of anhydrous acetone and 4.5 g. of dried sodium octanoate were added. The suspension was refluxed for 90 minutes, filtered and the solvent was evaporated under vacuum. The residue was dissolved in 10 ml. of methanol and treated with 100 ml. of chloroform. The solution was acidified with a methanol solution of hydrochloric acid to Congo red. The solution was then concentrated to about 50 ml. to yield a gelatinous precipitate of adriamycin-144-octanoate. By crystallization from methanol-chloroform 1.7 g. of product melting at 168–170° C. were obtained; $[\alpha]_D^{20°}=+222°$ (c.=0.05 methanol).

EXAMPLE 9
Adriamycin-14-benzoate 1.0 g. of bromodaunomycin hydrochloride were suspended in 600 ml. of anhydrous acetone and treated with 3 g. of dried sodium benzoate. The solution was refluxed under stirring for 2 hours and the solvent was filtered off under vacuum. To the residue, 100 ml. of water, 100 ml. of chloroform and 2 g. of sodium bicarbonate were added. The mixture was shaken and the whole was transferred into a separating funnel. Two layers were separated and the aqueous phase was extracted again with chloroform. The organic extracts were washed with water, evaporated to about 50 ml. and acidified to Congo red with 1 N hydrochloric acid in methanol. A semi-crystalline precipitate of adriamycin-14-benzoate hydrochloride was obtained. By crystallization from methanol-chloroform, 0.6 g. of product melting at 188–190° C. was obtained; $[\alpha]_D^{20°}=+224°$ (c=0.05 methanol).

EXAMPLE 10
Adriamycin-14-propionate 1 g. of bromodaunomycin hydrochloride was suspended in 650 ml. of anhydrous acetone and 2 g. of anhydrous sodium propionate were added. The suspension was refluxed under shaking for 1 hour and a half, the solution was then cooled, filtered and evaporated under vacuum. The residue was dissolved in 50 ml. of 0.1 N hydrochloric acid and the solution was extracted twice with chloroform, and five times with normal butyl alcohol until all the colored product passed through the organic layer. After concentration of the butanol solution under vacuum, 0.620 g. of crystalline, deeply red colored adriamycin-14-propionate hydrochloride, melting at 178–185° C., was obtained; $[\alpha]_D^{22°}=+240°$ (c.=0.05 methanol).

EXAMPLE 11
Adriamycin-14-phenylacetate 1 g. of bromodaunomycin hydrochloride was suspended in 600 ml. of anhydrous acetone and treated with 3 g. of anhydrous sodium phenylacetate. The suspension was refluxed and shaken for one hour and then cooled, filtered and evaporated to dryness, under vacuum. The residue was dissolved in 100 ml. of 0.1 N hydrochloric acid. The obtained solution was extracted twice with chloroform and then with normal butyl alcohol until the whole colored product passed into the organic layer. The collected butanol solutions were washed twice with small volumes of water and, after separation of the washings, concentrated under vacuum until crystallization occurred. After a convenient standing: 14-phenyl-acetyl-adriamycin hydrochloride was collected on the filter. It was an orange-red colored amorphous precipitate. The mixture was dried at 40° C. under vacuum and 0.7 g. of product melting at 175–177° C. was obtained; $[\alpha]_D^{23°}=+220°$ (c.=0.05 methanol).

EXAMPLE 12
Adriamycin-14-nicotinate 1 g. of bromodaunomycin hydrochloride was suspended in 600 ml. of anhydrous acetone and 3 g. of dried potassium nicotinate were added. The suspension were shaken and refluxed for 2 hours, then cooled, filtered and evaporated to dryness under vacuum. The residue was treated with 100 ml. of chloroform and 100 ml. of 2% sodium bicarbonate aqueous solution. The mixture was well shaken and the product was all transferred into a separating funnel. The two layers were separated while the aqueous phase was re-extracted with chloroform until all the colored product was transferred into the organic phase. The collected chloroformic extracts were washed with water, evaporated to about 50 ml. and acidified to Congo red with 1 N hydrochloric acid in methanol. An amorphous precipitate of adriamycin-14-nicotinate hydrochloride was obtained and recovered over a filter and crystallized from methanol-chloroform. 0.5 g. of product melting at 180–182° C. was obtained; $[\alpha]_D^{23°}=+212°$ (C.=0.05 methanol).

Operating as described in the previous examples, but employing salts of other acids, the following adriamycin esters were obtained: adriamycin-14-formate, adriamycin-14-butyrate, adriamycin-14-glycolate, adriamycin-14-glycinate, adriamycin-14-emysuccinate, adriamycin-14-(2′-hydroxy-naphthoate), adriamycin - 14-cyclopentylpropionate, adriamycin - 14-(2′-pyrrolcarboxylate), adriamycin-14-carbamate and adriamycin-14-ethylcarbonate.

What is claimed is:

1. A process for the preparation of adriamycin of the formula:

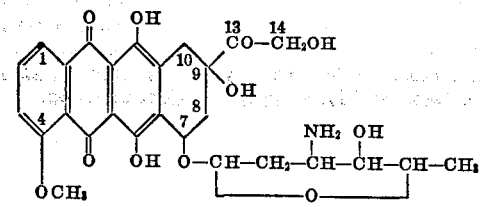

which consists of reacting a compound selected from the group consisting of daunomycin and its derivatives of the formula:

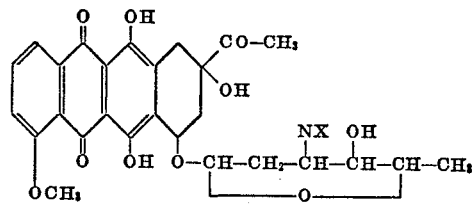

wherein X is selected from the group consisting of

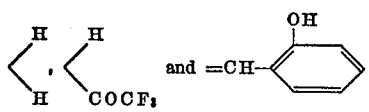

in a solvent consisting of a mixture of methanol and cyclic ether, in a ratio of from 1:1.5 to 1:4.5, by volume, with a halogen of the group consisting of bromine and iodine, to yield the corresponding 14-halo-derivative, reacting the 14-halo-derivative with an alkali metal acetate in the presence of acetone to give the corresponding 14-acetoxy derivative, alkaline hydrolyzing the 14-acetoxy derivative into the 14-hydroxy derivative, isolating the latter and purifying the same after eliminating the protecting group of the amino group of the amino sugar.

2. The process of claim 1, wherein the 14-halo derivative is directly transformed by alkaline hydrolysis into the 14-hydroxy derivative.

3. A process for preparing adriamycin 14-esters of the formula:

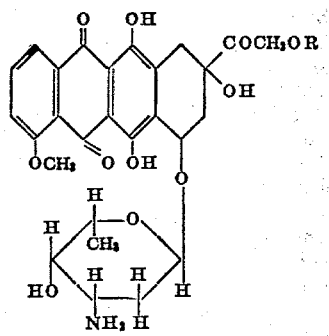

wherein R is an acyl radical of an acid selected from the group consisting of acetic, octanoic, benzoic, propionic, phenylacetic, nicotinic, formic, butyric, glycolic, glycinic, succinic, 2'-hydroxy-naphthoic, cyclopentylpropionic, 2'-pyrrolcarboxylic, carbamic and ethylcarbonic acids, which comprises reacting a compound selected from the group consisting of 14-bromo-daunomycin and one of its salts with a compound of the formula R—OM; wherein R has the above-mentioned meaning and M is selected from the group consisting of an alkaline, alkaline earth metal, the quaternary ammonium radical and the quaternary ammonium radical substituted by alkyl groups, in an inert polar solvent, and isolating the product obtained.

4. A compound of the formula:

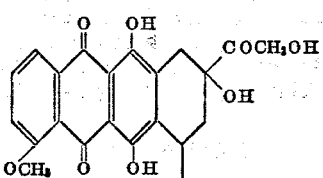

wherein R is an acyl radical of an acid selected from the group consisting of acetic, octanoic, benzoic, propionic, phenylacetic, nicotinic, formic, butyric, glycolic, glycinic, succinic, 2'-hydroxy-naphthoic, cyclopentylpropionic, 2'-pyrrolcarboxylic, carbamic and ethylcarbonic acids.

5. The product of claim 4, which is adriamycin-14-acetate.

6. The product of claim 4, which is adriamycin-14-octanoate.

7. The product of claim 4, which is adriamycin-14-benzoate.

8. The product of claim 4, which is adriamycin-14-propionate.

9. The product of claim 4, which is adriamycin14-phenylacetate.

10. The product of claim 4, which is adriamycin-14-nicotinate.

References Cited
UNITED STATES PATENTS 3,590,028   6/1971   Arcamone et al. ____ 260—210 R
3,686,163   8/1972   Arcamone et al. __ 260—210 AB JOHNNIE R. BROWN, Primary Examiner U.S. Cl. X.R.

195—80; 260—396; 424—18

UNITED STATES PATENT OFFICE
CERTIFICATE OF CORRECTION

Patent No. 3,803,124  Dated April 9, 1974

Inventor(s) Federico Arcamone et al

It is certified that error appears in the above-identified patent and that said Letters Patent are hereby corrected as shown below:

Column 1, line 12: "15,159/68; May 4, 1971, 24,030/71" should read -- 15,159 A/68; May 4, 1971, 24,030 A/71 --. Column 1, lines 51-52: "therapeutiactive" should read -- therapeutically active --. Column 1, line 56: "antibiotic has" should read -- antibiotic and has --.

Column 4, Table II, Column 4: "mg./kgl day" should read -- mg./kg./day --.

Column 6, line 21: "was"(second occurrence) should read -- with --.

Column 7, line 75: "(30 ml.)" should read -- (40 ml.) --.

Column 8, line 9: "precipitated" should read -- precipitate, --.

Column 9, line 19: "adriamycin-144-octanoate" should read -- adriamycin-14-octanoate --. Column 9, line 74: "standing:" should read -- standing period: --.

Column 10, line 10: "suspension were shaken" should read -- suspension was shaken --.

Signed and sealed this 22nd day of October 1974.

(SEAL)
Attest:

McCOY M. GIBSON JR.
Attesting Officer

C. MARSHALL DANN
Commissioner of Patents

UNITED STATES PATENT AND TRADEMARK OFFICE
CERTIFICATE OF CORRECTION

PATENT NO. : 3,803,124
DATED : April 9, 1974
INVENTOR(S) : Federico Arcamone, et al.

It is certified that error appears in the above-identified patent and that said Letters Patent is hereby corrected as shown below:

Column 11, line 8, "2. The process of claim 1, wherein"

should read --2. A process for preparing adriamycin in which a 14-halo derivative is prepared in accordance with the process of claim 1, and thereafter--.

Signed and Sealed this

Twenty-eighth Day of February, 1989

Attest:

DONALD J. QUIGG

*Attesting Officer*    *Commissioner of Patents and Trademarks*